United States Patent
Clarke et al.

(10) Patent No.: US 7,625,663 B2
(45) Date of Patent: *Dec. 1, 2009

(54) CERIUM BATTERIES

(75) Inventors: Robert Lewis Clarke, Orinda, CA (US); Brian Dougherty, Menlo Park, CA (US); Stephen Harrison, Benicia, CA (US); Peter J. Millington, Weaverham (GB); Samaresh Mohanta, Fremont, CA (US)

(73) Assignee: Plurion Limited Company (GB)

( * ) Notice: Subject to any disclaimer, the term of this patent is extended or adjusted under 35 U.S.C. 154(b) by 866 days.

This patent is subject to a terminal disclaimer.

(21) Appl. No.: 10/483,941

(22) PCT Filed: Feb. 12, 2002

(86) PCT No.: PCT/US02/04749

§ 371 (c)(1),
(2), (4) Date: May 24, 2004

(87) PCT Pub. No.: WO03/017395

PCT Pub. Date: Feb. 27, 2003

(65) Prior Publication Data

US 2004/0202925 A1 Oct. 14, 2004

(51) Int. Cl.
*H01M 4/36* (2006.01)
*H01M 6/16* (2006.01)
*H01M 6/04* (2006.01)

(52) U.S. Cl. .................. 429/105; 429/340; 429/347

(58) Field of Classification Search .............. 429/105, 429/340, 347
See application file for complete search history.

(56) References Cited

U.S. PATENT DOCUMENTS

| | | | |
|---|---|---|---|
| 4,784,924 A | 11/1988 | Savinell et al. | 429/15 |
| 4,814,241 A | 3/1989 | Nagashima et al. | 429/133 |
| 5,061,578 A | 10/1991 | Kozuma et al. | 429/3 |
| 5,318,865 A | 6/1994 | Kaneko et al. | 429/345 |
| 5,366,824 A | 11/1994 | Nozaki et al. | 429/34 |
| 5,610,802 A | 3/1997 | Eidler et al. | 361/831 |
| 5,851,694 A | 12/1998 | Miyabayashi et al. | 429/105 |
| 6,143,443 A * | 11/2000 | Kazacos et al. | 429/204 |
| 6,190,801 B1 * | 2/2001 | Tokuda et al. | 429/231 |
| 6,475,661 B1 | 11/2002 | Pellegri et al. | 429/105 |
| 6,613,298 B2 | 9/2003 | Tanaka | 423/62 |
| 6,652,819 B2 | 11/2003 | Shiroto | 423/62 |
| 6,692,862 B1 | 2/2004 | Zocchi | 429/50 |

OTHER PUBLICATIONS

Iwasa, et al., Fundamental Studies on the Electrolyte Solutions of Novel Redox Flow Battery for Electricity Storage, 2001.
Fang, at al., A Study of the Ce(III)/Ce(LV) Redox Couple for Redox Flow Battery Application, Apr. 8, 2002.

* cited by examiner

*Primary Examiner*—Patrick Ryan
*Assistant Examiner*—Thomas H. Parsons
(74) *Attorney, Agent, or Firm*—Fish & Associates, PC

(57) ABSTRACT

A power cell (100A) has an electrolyte that includes a reodox pair comprising cerium. The electrolyte in preferred cells is an acid electrolyte that comprises a element ion complexed by an organic acid or a chelating agent, and contemplated electrolytes may further include a compound that reduces the hydrogen overpotential. Where the power cell comprises a plurality of cells (100B), preferred configurations may include glassy carbon as bipolar electrolytes.

20 Claims, 2 Drawing Sheets

CERIUM BATTERIES

FIELD OF THE INVENTION

The field of the invention generally pertains to batteries and other types of power cells.

BACKGROUND OF THE INVENTION

Many types of batteries and other power cells are known, based upon a relatively wide range of electrical couples. Among the most popular electrical couples are those containing zinc. Zinc is regarded as the highest energy couple component that can be cycled in an aqueous room temperature battery and is therefore commonly used in numerous battery and power cell applications. Depending on the type of coupling partner such zinc containing batteries will exhibit various characteristic properties.

For example, zinc is coupled with carbon in most simple flashlight batteries to provide a relatively inexpensive and reliable power source. Although manufacture of Zn/C batteries is generally simple and poses only relatively little environmental impact, various disadvantages of Zn/C batteries exist. Among other things, the ratio of power to weight in commonly used Zn/C batteries is relatively poor. To improve the ratio of power to weight, alternative coupling partners and systems can be employed. For example, zinc can be coupled with mercury oxide or silver to achieve an improved power to weight ratio. However, the toxicity of mercury oxide is frequently problematic in manufacture and tends to become even more problematic when such batteries are discarded. On the other hand, while silver as a coupling partner for zinc is environmentally substantially neutral and significantly improves the power to weight ratio, the use of silver is in many instances economically prohibitive.

In still further known batteries and power cells, zinc is coupled with still other metals such as nickel, copper, or manganese to provide a specific desired characteristic. However, and depending on the particular metal, new disadvantages may arise and particularly include environmental problems with manufacture and/or disposal, relatively low power to weight ratio, and undesirably low open circuit voltage.

Furthermore, halogens may be employed as a coupling partner for zinc, and most common zinc-halogen couples include zinc-bromine and zinc-chloride (e.g., for load leveling batteries). However, such battery configurations are often difficult to integrate into portable or miniaturized devices. Moreover, such battery configurations typically require pumping systems and are often prone to leakage leading to significant problems due to the highly corrosive nature of halogens.

Alternatively, oxygen may be employed as a gaseous coupling partner for zinc, thereby generally avoiding problems associated with toxicity, excessive cost for coupling partners, or spillage. Among the various advantages in this configuration, using air (i.e., oxygen) as coupling partner for zinc typically results in a relatively high power to weight ratio. Moreover, the zinc-oxygen system typically provides a relatively flat discharge curve. However, reasonable shelf life of such batteries can often only be achieved by using an airtight seal. Furthermore, to provide continuous operation, air must have an unobstructed path through the battery to the cathode so that the oxygen in the air is available to discharge the cathode. Moreover, commercial applications of zinc-air batteries have previously been limited to primary or non-rechargeable types. Experimental rechargeable zinc-air batteries have been built for use in automotive applications and typically use a liquid electrolyte that is recirculated via a pump. However, such systems are often impractical for miniature consumer applications ranging from radios to portable computers because of their mechanical complexity and lack of leak resistance.

An additional problem with zinc-air batteries often arises from the use of an alkaline electrolyte, which is typically disposed between a porous zinc anode and an air cathode formed of a carbon membrane. Unfortunately, the use of alkaline electrolytes in such electrodes frequently leads to absorption of carbon dioxide, and consequently formation of carbonates, which in turn tend to reduce conductivity and clog the pores in the active surfaces of the electrodes.

Thus, although there are numerous coupling partners for zinc in batteries and power cells known in the art, all or almost all of them suffer from one or more disadvantage. Therefore, there is still a need to provide compositions and methods for improved batteries.

SUMMARY OF THE INVENTION

The present invention is generally directed to an electrical power cell having an electrolyte that includes a redox pair comprising a first element and a second element, wherein the first element is cerium, and wherein preferred second elements include zinc, titanium, lead, mercury, chromium, cadmium, and tin. Especially preferred power cells include an acid electrolyte in which cerium and zinc form a redox pair, and will have an open circuit voltage of at least 2.4 Volt.

In one aspect of the inventive subject matter, contemplated electrolytes are acid electrolytes, and particularly contemplated acid electrolyte comprise an organic acid. Especially preferred acid electrolytes include methane sulfonic acid, which may form a complex with cerium and/or the second metal when the methane sulfonic acid is deprotonated and when the cerium and/or second element is in a cationic form. Contemplated electrolytes may also include a chelating agent (e.g., ethylenediamine tetraacetic acid) and/or a compound that reduces hydrogen overpotential (e.g., indium, bismuth, tin, gallium, thallium, diindium trioxide, dibismuth trioxide, tin oxide, and/or digallium trioxide).

In another aspect of the inventive subject matter, contemplated power cells may comprise a cell with a separator that separates the cell into a cathode compartment and an anode compartment, wherein the cathode compartment includes a catholyte that includes the cerium, and wherein the anode compartment comprises an anolyte that includes the second element. In further contemplated aspects, the anode compartment comprises at least 5 vol %, or at least 10 vol % catholyte under normal operating conditions. Preferred separators comprise a solid polymer electrolyte membrane, typically a copolymer of perfluorosulfonic acid and polytetrafluoroethylene (commercially available under the trade name NAFION™). In a further aspect of the inventive subject matter, contemplated power cells comprise a plurality of cells, and wherein at least some of the cells include a bipolar electrode, which is preferably manufactured from glassy carbon.

Various objects, features, aspects, and advantages of the present invention will become more apparent from the following detailed description of preferred embodiments of the invention, along with the accompanying drawing.

DETAILED DESCRIPTION

The inventors have surprisingly discovered that power cells, and particularly batteries can be manufactured that have a redox pair comprising a first element and a second element, wherein the first element is cerium. Preferred electrolytes in such batteries include acid electrolytes, and most preferably acid electrolytes that include an organic acid.

As used herein, the term "redox pair" is interchangeably used with the term "redox couple" and refers to a combination of a first element (or ion of the first element) and second element (or ion of the second element) in a battery, in which reduction of the first element and oxidation of the second element produce the current provided by the battery.

As used herein, the term "first element" refers to a chemical element that may be in ionic form as well as in non-ionic form. For example, a preferred first element is zinc, which may be present as metallic (e.g., plated) zinc as well as ionic zinc (e.g., as $Zn^{2+}$ in a salt with an anion of an organic acid). Similarly, the term "second element" refers to a chemical element that may be in ionic form as well as in non-ionic form. For example, a preferred second element is cerium, which may be present in a first ionic form (e.g., $Ce^{3+}$ in a salt with an anion of an organic acid) as well as in a second ionic form (e.g., as $Ce^{4+}$ in a salt with an anion of an organic acid). Furthermore, it is generally contemplated that the first and second elements are chemically distinct, i.e., are not the same chemical element in a different oxidation state. Still further, it should be appreciated that the term element also includes combination of one element with a second (or more) elements to form a molecule. For example, suitable elements also include metal oxides or metal hydrides.

As still further used herein, the term "anode" refers to the negative electrode of a battery (i.e., the electrode where oxidation occurs) during discharge of the battery. Thus, the term "anode compartment" refers to the battery compartment that includes the anode, and the term "anolyte" refers to the electrolyte in the anode compartment. Similarly, the term "cathode" refers to the positive electrode of a battery (i.e., the electrode where reduction occurs) during discharge of the battery. Thus, the term "cathode compartment" refers to the battery compartment that includes the cathode, and the term "catholyte" refers to the electrolyte in the cathode compartment.

Figure 1A:
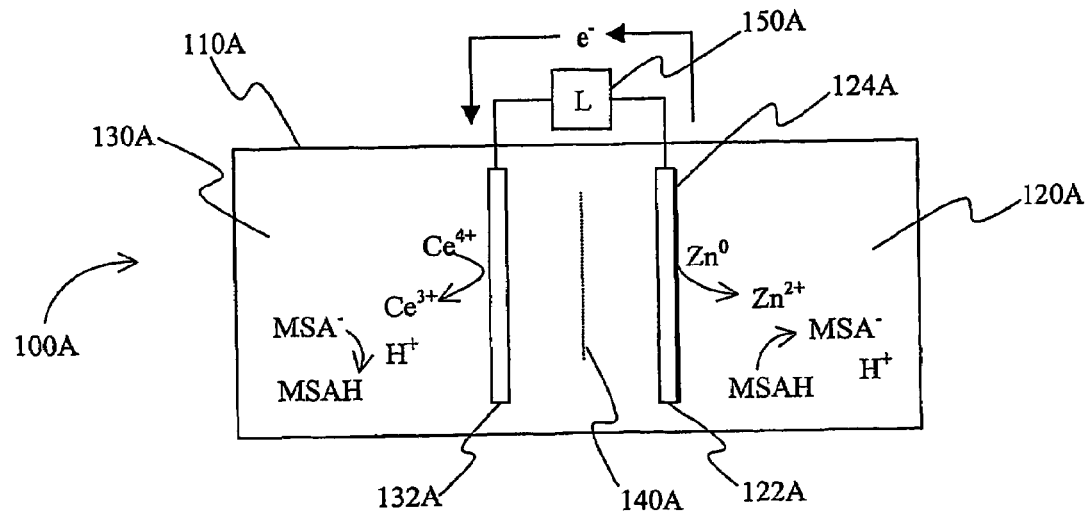
FIG. 1A is a schematic view of an exemplary battery during discharge.

In a particularly preferred aspect, an exemplary battery is depicted in FIG. 1A during discharge. Here, the battery 100A includes a cell 110A that is at least partially divided by separator 140A into an anode compartment 120A and a cathode compartment 130A. Both anode and cathode compartments include methane sulfonic acid as acid electrolyte, wherein the anion of the methane sulfonic acid ($MSA^-$) complexes the ionic forms of zinc ($Zn^{2+}$) and cerium ($Ce^{3+/4+}$). The anode compartment 120A further comprises anode 122A that is at least partially covered by non-ionic plated metallic zinc ($Zn^0$) 124A. The cathode compartment 130A comprises cathode 132A. Anode 122A and cathode 132A are electrically coupled to the load 150A, and the arrow above the load indicates the flow of the electrons from the anode to the cathode during discharge.

Figure 1B:
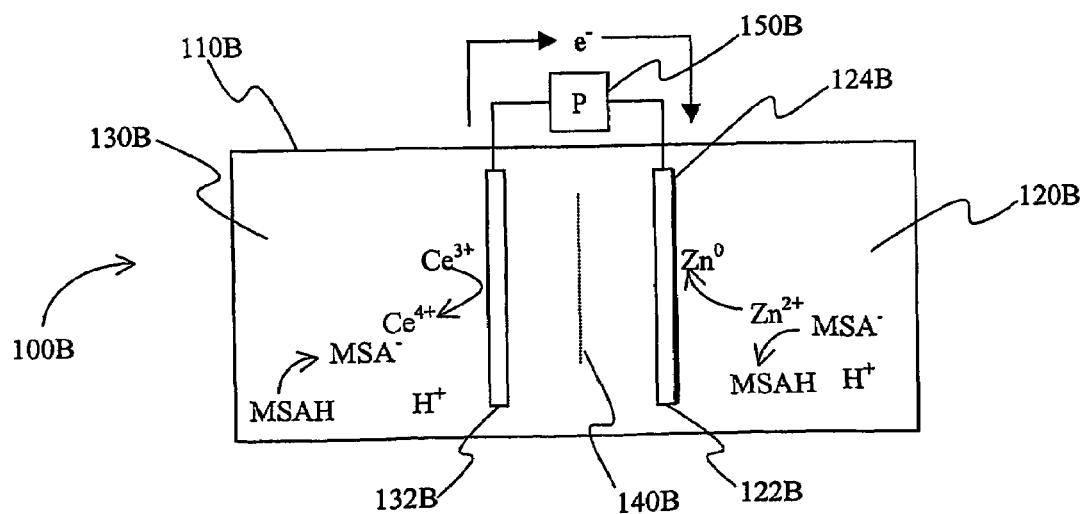
FIG. 1B is a schematic view of an exemplary battery during charging.

Similarly, FIG. 1B depicts an exemplary battery during charge. Here, the battery 100B includes a cell 110B that is at least partially divided by separator 140B into an anode compartment 120B and a cathode compartment 130B. Both anode and cathode compartments include methane sulfonic acid as acid electrolyte, wherein the anion of the acid ($MSA^-$) complexes the ionic forms of zinc ($Zn^{2+}$) and cerium ($Ce^{3+/4+}$). The anode compartment 120B further comprises anode 122B that is at least partially covered by non-ionic plated metallic zinc ($Zn^0$) 124B. The cathode compartment 130B comprises cathode 132B. Anode 122B and cathode 132B are electrically coupled to the power source 150B, and the arrow above the power source indicates the flow of the electrons during charging of the battery.

Thus, the inventors contemplate that zinc will be dissolved into the electrolyte upon discharge of the battery, and plated onto one electrode during charging while cerium ions will donate/receive electrons on the other electrode following the equations (I) and (II) below.

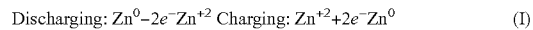

Discharging: $Zn^0 - 2e^- Zn^{+2}$ Charging: $Zn^{+2} + 2e^- Zn^0$     (I)

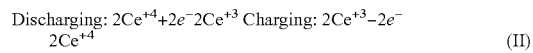

Discharging: $2Ce^{+4} + 2e^- 2Ce^{+3}$ Charging: $2Ce^{+3} - 2e^- 2Ce^{+4}$     (II)

In an exemplary Zn/Ce redox system using methane sulfonic acid as one component in the electrolyte, it is contemplated that the following reactions occur during charging (The reactions are reversed on discharge):

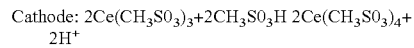

Cathode: $2Ce(CH_3SO_3)_3 + 2CH_3SO_3H \, 2Ce(CH_3SO_3)_4 + 2H^+$

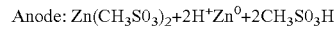

Anode: $Zn(CH_3SO_3)_2 + 2H^+ Zn^0 + 2CH_3SO_3H$

It should be especially recognized that by employing cerium in contemplated batteries various advantageous properties may be achieved. Among other things, the standard redox potential of the elements in contemplated redox systems (e.g. Ce/Zn) will allow normal operation of such batteries even if the electrolyte from the anode and cathode compartment are mixed. As used herein, the term "mixed electrolyte" refers to an electrolyte in which the first and second element are present in the same compartment (i.e., anode and/or cathode compartment) under normal operating conditions (i.e., when the battery is charged and/or discharged without substantial reduction (i.e., more than 10%) of electrode performance and/or battery capacity). The term "normal operating condition" as used herein specifically excludes operation during which a separator has been accidentally perforated (e.g., during charging). Furthermore, only hydrogen ions are moving through the membrane (i.e., the separator) in a battery during charge and discharge. Consequently, it should be recognized that by virtue of proton migration upon charging such batteries, the hydrogen ion concentration proximal to the separator will be sufficiently high to dissolve dendrites forming from the electrodes. Moreover, the capacity of such batteries will predominantly only be limited by the supply of the catholyte and anolyte.

With respect to the first element it is contemplated that suitable elements need not necessarily be limited to cerium, and it is generally contemplated that alternative elements also include various lanthanides, and especially praseodymium, neodymium, terbium, and dysprosium. Alternatively, suitable lanthanides may also include samarium, europium, thulium and ytterbium.

Where a lanthanide other than cerium is employed as the redox partner for zinc, it is generally contemplated that the concentration of the alternative lanthanide will typically depend, among other factors, on the solubility of the particular lanthanide and/or the concentration of a complexing agent (e.g., counter ion, mono- or polydentate ligand, etc.). Thus, it is contemplated that suitable concentrations of contemplated non-cerium lanthanides will typically be in the range of 10 micromolar (and even less) up to the saturation concentration of the particular lanthanide (up to 3M, and even higher) in the electrolyte.

Furthermore, it should be recognized that the cost of production of contemplated batteries might be significantly reduced by employing mixtures of lanthanides (i.e., by adding at least one additional lanthanide to a lanthanide-zinc redox pair). For example, it is contemplated that suitable lanthanide mixtures include naturally occurring mixtures (e.g., Bastnasite or Monazite), enriched fractions (e.g., Cerium concentrate or Lanthanum concentrate), or mixtures with predetermined quantities of two or more lanthanides. Mixtures of lanthanides as redox partner with zinc are thought to be especially advantageous where such mixtures include elements with electrochemically similar behavior, or where such mixtures include a predominant fraction (e.g., greater than 80 mol %) of a lanthanide with a desired electrochemical behavior. Consequently, where at least two lanthanides are included as redox partners with zinc, it should be appreciated that the molar ratio between the first and second lanthanide may vary considerably. For example, where the second lanthanide is present only as a trace or impurity, the ratio between first and second lanthanide may be between about 0.01%:about 99.99% and about 5%:about 95%. On the other hand, where the second lanthanide is present in appreciable quantities, the ratio between first and second lanthanide may be between about 5%:about 95% and about 49.9%:about 50.1%. Similarly, ternary and higher mixtures of lanthanides may act as the redox partner for zinc, and the molar ratio among the individual lanthanides may vary considerably. Numerous further aspects of alternative first elements are described in PCT application entitled "Lanthanide Batteries" by Robert Lewis Clarke, Brian J. Dougherty, Stephen Harrison, J. Peter Millington and Samaresh Mohanta, which was filed on or about Feb. 12, 2002, and which is incorporated by reference herein.

With respect to the amount of cerium, it is contemplated that the cerium ion concentration may vary considerably and may generally be in the range of between one micromolar (and even less) and the maximum saturation concentration of the particular cerium ion. However, it is preferred that the cerium ion concentration in the electrolyte is at least 0.2M, more preferably at least 0.5M, and most preferably at least 0.7M. Viewed from another perspective, it is contemplated that preferred cerium ion concentrations lie within 5-95% of the solubility maximum of cerium ions in the electrolyte at a pH<7 and 20° C.

It is further contemplated that the cerium ions may be introduced into the electrolyte in various chemical forms. However, it is preferred that cerium ions are added to the electrolyte solution in form of a salt, preferably cerium carbonate. However, numerous alternative chemical forms, including cerium hydrate, cerium acetate, or cerium sulfate are also contemplated.

With respect to the second element it is generally preferred that zinc is the redox partner for cerium (or other first element). However, it should be appreciated that numerous alternative elements are also suitable for use in conjunction with the teachings presented herein, and particularly preferred alternative elements include titanium and chromium. Other suitable elements include lead, mercury, cadmium, and/or tin.

Similarly, the concentration of zinc ions in the electrolyte is at least 0.05M, preferably at least 0.1M, more preferably at least 0.3M, even more preferably at least 0.5M, and most preferably at least 1.2M. With respect to the particular form of zinc addition to the electrolyte, the same considerations as described above apply. Thus, contemplated zinc forms include $ZnCO_3$, ZnAcetate, $Zn(NO_3)_2$, etc.

In yet another aspect of the inventive subject matter, it is contemplated that the electrolyte need not be limited to a particular composition. However, it is generally preferred that suitable electrolytes are acid electrolytes (i.e., have a pH of less than 7.0), and it is contemplated that numerous organic and inorganic acids may be used. Particularly preferred acids include organic acids and all acids that are able to dissolve ceric and cerous ions (as well as other high energy redox cations and anions, e.g., $Ti^{3+}$, or $Cr^{2+}$) at a relatively high concentration (i.e., at least 50 mM, more preferably at least 100 mM, and most preferably at least 1M).

An especially preferred organic acid that dissolves ceric and cerous ions at a relatively high concentration is methane sulfonic acid. With respect to the concentration of the MSA or other acid it should be appreciated that a particular concentration of MSA is not limiting to the inventive subject matter. However, a particularly preferred concentration of methane sulfonic acid is in the range of between 1M and 4M, and more preferably between 2.5M and 3.5M. In further alternative aspects of the inventive subject matter, it is contemplated that EDTA or alternative chelating agents could replace at least a portion, if not all of the methane sulfonic acid in at least the zinc cathode part of the cell.

Alternative organic acids include trifluoromethane sulfonic acid ($CF_3SO_3H$), which may make a better solvent anion than methane sulfonic acid for ceric ions and would make an excellent high energy battery for special applications. Still further contemplated acids include inorganic acids such as perchloric acid ($HClO_4$), nitric acid, hydrochloric acid (HCl), or sulfuric acid ($H_2SO_4$). However, such alternative acids may impose safety concerns or exhibit less advantageous capability to dissolve high concentrations of ceric ions.

In still further alternative aspects, it is contemplated that the electrolyte may also be gelled, and that preferred gelled electrolytes include one or more anions of an organic or inorganic acid. Various suitable methods and compositions for gelled electrolytes are disclosed in the PCT patent application entitled "Improved Battery With Gelled Electrolyte" by Robert Lewis Clarke, Brian J. Dougherty, Stephen Harrison, J. Peter Millington and Samaresh Mohanta, which was filed on or about Feb. 12, 2002, which is incorporated herein by reference.

Figure 1C:
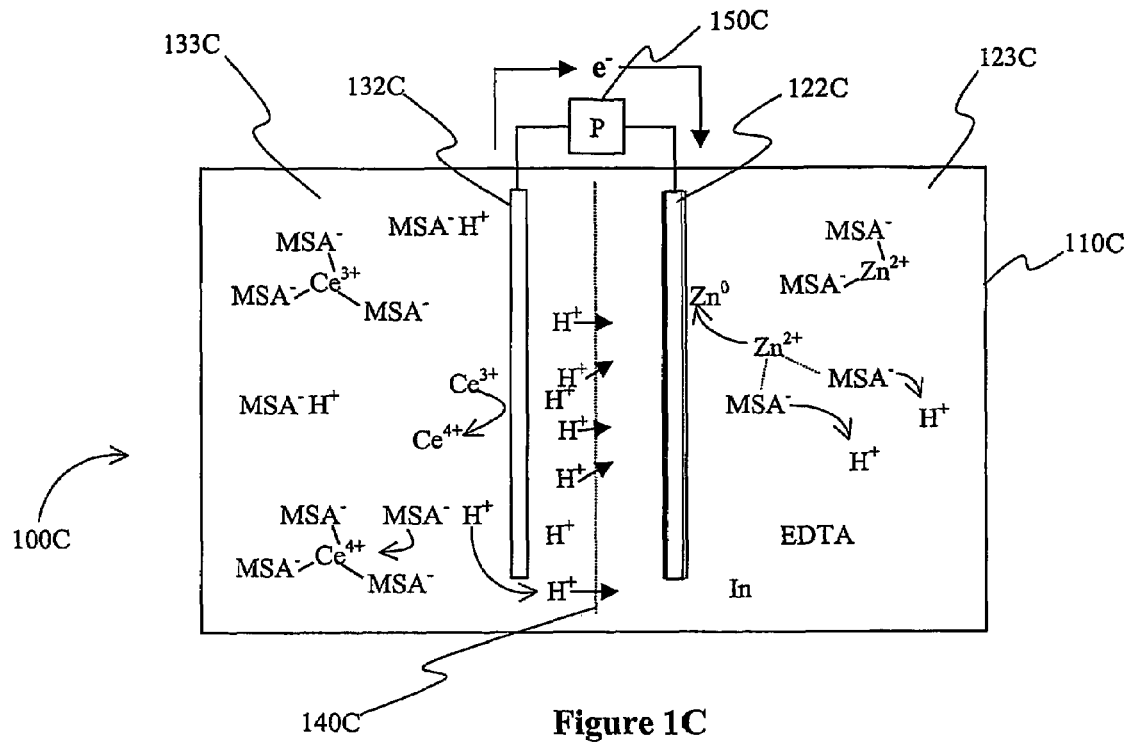
FIG. 1C is another schematic view of an exemplary battery during charging.

A particular advantage of using organic acids that are capable of complexing at least one of the cerium and zinc ions is depicted in FIG. 1C. Here, battery 100C has a cell 110C that includes a separator 140C separating the cell in the cathode compartment comprising catholyte 133C, and the anode compartment comprising anolyte 123C. Both anolyte and catholyte comprise an acid electrolyte with methane sulfonic acid in deprotonated form (MSA) and protonated form (MSAH). Further included in the electrolytes is a chelator preferably EDTA), and a compound that reduced the hydrogen overpotential (preferably Indium). Upon charging with power source 150C, zinc is plated onto anode 122C from zinc that was previously complexed by two molecules of deprotonated MSA. Thus, at least some of the MSA anions will form protonated MSAH. Similarly, $cerium^{3+}$ will be oxidized on the cathode 132C to $cerium^{4+}$, whereby the additional positive charge on the cerium ion is neutralized by forming a complex with deprotonated MSA, which was previously protonated. Consequently, at least some protons are liberated from the MSAH and migrate from the cathode compartment to the anode compartment during charging.

In a still further contemplated aspect of the inventive subject matter, and especially where it is desirable to obtain a relatively high current efficiency of zinc plating during charging, it is preferred that Indium is added to the electrolyte to significantly increase the hydrogen overpotential. Addition of Indium is thought to act as a barrier to hydrogen evolution, thereby forcing zinc deposition upon charging of the battery. While addition of indium to alkaline electrolytes has been previously shown to reduce hydrogen the hydrogen overpotential, the inventors surprisingly discovered that zinc deposition in an acid electrolyte in the presence of indium ions was almost 95% efficient compared to 70-80% without indium (at less than 1% substitution of indium ions for zinc ions in the electrolyte).

Of course, it should be recognized that reduction of the hydrogen overpotential in contemplated batteries need not be limited to addition of indium to the electrolyte at a particular concentration, but various alternative elements (typically metals, most typically group 13 elements) at numerous other concentrations are also contemplated. For example, suitable elements include bismuth (Bi), tin (Sn), gallium (Ga), thallium (Tl), and various oxides, including diindium trioxide ($In_2O_3$), dibismuth trioxide ($Bi_2O_3$), tin oxide (SnO) and digallium trioxide ($Ga_2O_3$). With respect to the concentration of such metals and other hydrogen overpotential reducing compounds, it is generally preferred that the concentration is less than 5 mol % (relative to Zn), more typically less than 2 mol % (relative to Zn), and even more typically less than 1 mol % (relative to Zn). However, and especially where such elements or other compounds exhibit a relatively high solubility, concentrations of more than 5 mol % (relative to Zn) are also considered suitable.

While in some battery configurations a NAFION™ (copolymer of perfluorosulfonic acid and polytetrafluoroethylene) membrane may operate more satisfactorily than other membranes, it is generally contemplated that the exact physical and/or chemical nature of the membrane is not limiting to the inventive subject matter so long as such membranes allow $H^+$ exchange between an anode and cathode compartment in contemplated acidic electrolytes. Consequently, it should be appreciated that numerous alternative membranes other than NAFION™ are also suitable, and exemplary membranes include all known solid polymer electrolyte membranes, or similar materials.

Furthermore, it should be especially recognized that in contemplated batteries membranes are suitable for use even if such membranes exhibit some leakage or permeability for catholyte and/or anolyte into the opposite compartment, since contemplated batteries are operable even under conditions in which the electrolytes are mixed (supra). Various aspects of mixed electrolytes in contemplated batteries are disclosed in the PCT patent application entitled "Mixed Electrolyte Battery" by Robert Lewis Clarke, Brian J. Dougherty, Stephen Harrison, J. Peter Millington and Samaresh Mohanta, which was filed on or about Feb. 12, 2002, which is incorporated herein by reference.

In a particularly preferred aspect of the inventive subject matter, it should be recognized that by virtue of proton migration upon charging of such batteries, the hydrogen ion concentration proximal to the separator will be sufficiently high to dissolve dendrites forming from the electrodes.

In yet further alternative aspects of the inventive subject matter, it is contemplated that suitable batteries may be configured in a battery stack in which a series of battery cells are electrically coupled to each other via a bipolar electrode. The particular nature of the bipolar electrode is not limiting to the inventive subject matter, and it is generally contemplated that any material that allows for oxidation of cerous ions to ceric ions during charging (and the reverse reaction during discharge) and plating/de-plating of zinc is suitable for use herein. However, a particularly preferred material for a bipolar electrode is glassy carbon (carbon that exhibits no long-range order in three dimensions). The inventors surprisingly discovered that glassy carbon provides, despite operation in a highly acidic electrolyte, an excellent substrate for plating of zinc during charging. Furthermore, glassy carbon is a relatively inexpensive and comparably light-weight material, thereby further improving the ratio of cost/weight to capacity.

Figure 2:
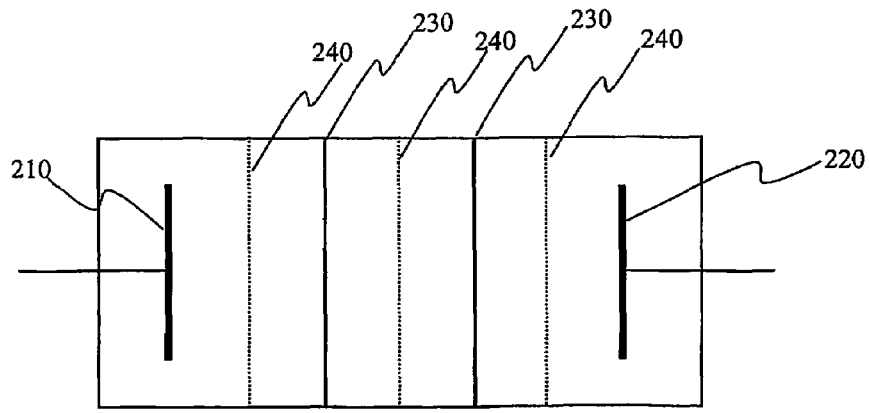
FIG. 2 is a schematic view of an exemplary battery having multiple cells.

An exemplary stacked battery configuration is depicted in FIG. 2 in which the battery 200 has a cathode 210 and an anode 220, and wherein a plurality of diaphragms 240 separate the battery in a plurality of cells. Each of the cells (excluding the cells that comprise the anode or cathode) includes a bipolar electrode 230. Further contemplated aspects of bipolar electrodes are disclosed in U.S. provisional patent application with the title "Electric Devices With Improved Bipolar Electrode" by Robert Lewis Clarke, Brian J. Dougherty, Stephen Harrison, J. Peter Millington and Samaresh Mohanta, which was filed on or about Feb. 12, 2002, which is incorporated by reference herein.

Particularly useful applications of the inventive subject matter presented herein include the use of contemplated electrolytes and electrodes in various battery types. For example, where the capacity of contemplated batteries is relatively high, it is contemplated that such electrolytes and electrodes may be employed in various load-leveling and stand-by battery configurations. On the other hand, contemplated electrolytes and electrodes may also be employed in primary and secondary battery types that are useful for household, automotive, and other uses where a relatively small battery capacity is required. Various aspects of configurations and use of contemplated batteries with especially high capacity is described in pending PCT application with the title "improved load leveling battery and methods therefor", serial number PCT/US01/41678, which is incorporated by reference herein.

Experiments

Secondary Zn—Ce Battery

To validate the concept of a secondary battery comprising an electrolyte that includes a cerium-metal redox pair, zinc was chosen as the metal, and a cell was constructed by using four blocks of plastic Ultra High Molecular Weight Polyethylene (UHMWP), with gaskets in between each face, two electrodes, and one Nafion® membrane. Electrolyte inlets and outlets were made in the center sections and electrolyte was fed from two small tanks via a peristaltic pump into the respective compartments.

The cerium solution contained 106 grams $Ce_2(CO_3)_3 \cdot 5H_2O$ in 480 ml methane sulfonic acid and 320 ml of water. The zinc solution contained 65 grams zinc carbonate in 240 ml methane sulfonic acid and 160 ml of water. The ceric solution was fed to the cathode made of coated titanium mesh ($TiO_2$), and the zinc solution was fed to the anode. Cell gap was 2.54 cm, flow rate about 2 liter per minute.

The cell was charged at 0.5 A (current density is 50 mA/cm$^2$) for five hours. The colorless cerous methane sulfonate turned yellow and the open circuit cell voltage was 3.33 volts. Only 3 grams of zinc would have been deposited by this time if the cell were running at 100% current efficiency. The cell was further run overnight at 0.2 A current and an additional 5 hours at 0.5 A. The open circuit voltage maximum was 2.46 V and the voltage across the cell during charging at 0.5 A was 2.7 V. To investigate the current efficiency, the cell was emptied and the anode side was inspected. The anode side contained approximately 9 grams of zinc, which is in very close agreement with the theoretical value expected for the charge passed. The zinc was placed in the electrolyte and the rate of spontaneous dissolving of the zinc was relatively slow. About 50% of the zinc was still observed after two hours, and some residual zinc remained after 72 hours.

Furthermore, very little gassing at the anode or cathode was observed during the charging process. Most of the zinc formed granular nodules on the titanium anode and eventually plated on the face of the membrane, while the ceric cathode appeared to be substantially free of deposits.

Compounds to Reduce Hydrogen Overpotential

Various experiments have been conducted to reduce the hydrogen overpotential in the cells according to the inventive subject matter. Among several promising candidates, addition of Indium (In) in concentrations of 1, 0.5, 0.25, 0.125 g/l in the electrolyte taken from the negative side showed relatively significant improvements in charge efficiency. Experimental conditions included static or unstirred flow condition, current density at 400 A/m$^2$, temperature about 60° C. In all cases, the charge efficiency was 90-95%, while the control with 0% In, when tested side by side, yielded a charge efficiency of about 40-45%. It should be appreciated, however, that in a flow cell the charge efficiency would be equal or higher.

Secondary Battery with Glassy Carbon Bipolar Electrode

A secondary battery was manufactured comprising an electrolyte that included a cerium-zinc redox pair. Similar to the configuration above, a series of cells were constructed by using blocks of plastic Ultra High Molecular Weight Polyethylene (UHMWP), with gaskets in between each face, two terminal electrodes, and one glassy carbon bipolar electrode (Destech Corporation, 1664 S. Research Loop, Suite 200, Tucson, Ariz. 85710). Electrolyte inlets and outlets were made in the center sections and electrolyte was fed from two small tanks via a peristaltic pump into the respective compartments.

The cerium solution contained 106 grams $Ce_2(CO_3)_3 \ast 5H_2O$ in 480 ml methane sulfonic acid and 320 ml of water. The zinc solution contained 65 grams zinc carbonate in 240 ml methane sulfonic acid and 160 ml of water. The ceric solution was fed to the cathode compartments (Cathode was coated titanium mesh), and the zinc solution was fed to the anode compartments (anode was titanium mesh). Cell gap was between the electrodes was 2.54 cm, at a flow rate of about 2 liter per minute.

The cell stack was charged at 0.5 A (current density is 50 mA/cm$^2$) for several hours, during which the colorless cerous methane sulfonate turned yellow in all cathode compartments. The color change in the cathode compartments indicated oxidation of the cerium 3$^+$ to cerium 4$^+$ by the glassy carbon electrode without use of a catalyst. Furthermore, oxidation of cerium 3$^+$ was consistent through several cycles without apparent deterioration in the charge or discharge cycles. Remarkably, there was also no apparent oxidative change in the glassy carbon electrode surface, indicating the despite the unfavorable reduction potential of carbon to cerium 3$^+$ the glassy carbon remained substantially unaffected over the entire test period. Moreover, repeated charge of the cell stack led to repeated and consistent plating of zinc on the anode side of the glassy carbon membrane, thereby clearly indicating the usefulness of glassy carbon as a bipolar electrode in secondary batteries with acid electrolyte.

Battery with Mixed Electrolyte

Based on previous experiments with rechargeable Ce—Zn batteries, a cell was built by using two blocks of plastic Ultra High Molecular Weight Polyethylene (UHMWP), with gaskets in between each face, two electrodes, and a Nafion® membrane that separated the cell into two compartments. Electrolyte inlets were formed in the top and bottom portion of each compartment; the electrolyte was introduced into the compartment via the bottom inlet and exited the cell from the top.

The anode compartment solution contained 193 grams/liter $Ce_2(CO_3)_3 \ast 5H_2O$, 97 g/l ZnO, 1000 g/l methanesulfonic acid (MSA) and 193 g/l of water. The cathode compartment solution contained 193 g/l $Ce_2(CO_3)_3 \ast 5H_2O$, 65 g/l ZnO, 1000 g/l methanesulfonic acid and 190 g/l of water. The cathode compartment solution was fed to the cathode made of platinum-coated titanium mesh, and the anode compartment solution was fed to the anode made of carbon. The cell gap was 1.7 cm, flow rate about 1.7 liter per minute.

The cell was charged at 4 A (current density is 40 mA/cm$^2$) for three hours. The voltage across the cell during charging at 4 A was 3.1 to 3.2 V. The initially colorless cathode compartment solution turned yellow during charging, indicating the conversion of cerous ions ($Ce^{3+}$) to ceric ions ($Ce^{4+}$). The efficiency of this reaction was almost 100%; the zinc ions ($Zn^{2+}$) did not react with either the $Ce^{3+}$ or $Ce^{4+}$, and were not oxidized at the electrode. Zinc was deposited as a smooth, light gray deposit from the anode compartment solution. The $Ce^{3+}$ ions were not reduced at the electrode. Furthermore, very little gassing at either the negative or positive electrode was observed during the charging process. After charging the cell, the open circuit voltage maximum was 2.4 V.

The cell was discharged at a constant voltage of 1.8 V. At the cathode, the intensity of the yellow color of the electrolyte decreased, indicating that $Ce^{4+}$ was being converted to $Ce^{3+}$. No deposits were observed on the cathode, indicating that no zinc was being plated. At the anode, zinc was dissolved into the electrolyte, but the solution remained colorless, indicating that $Ce^{3+}$ was not being converted to $Ce^{4+}$. The cell was recharged/discharged for several more cycles without substantial loss of performance.

Thus, specific embodiments and applications of improved power cells and compositions have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A battery comprising a cathode and an anode, wherein both the cathode and the anode are in contact with a catholyte and an anolyte, respectively, wherein the catholyte and the anolyte include first and second elements, respectively, wherein the first element is a lanthanide, wherein the second element is selected from the group consisting of zinc, titanium, lead, mercury, chromium, cadmium, and tin, and wherein reduction of the first element at the cathode and oxidation of the second element at the anode provides current produced by the battery.

2. The battery of claim 1 wherein each of the catholyte and the anolyte are an acid electrolyte.

3. The battery of claim 2, wherein the acid electrolyte comprises an organic acid.

4. The battery of claim 3, wherein the organic acid comprises methane sulfonic acid.

5. The battery of claim 4 wherein the methane sulfonic acid forms a complex with the lanthanide when the methane sulfonic acid is deprotonated and when the lanthanide is in a cationic form.

6. The battery of claim 5, wherein the methane sulfonic acid further forms a complex with the second element when the methane sulfonic acid is deprotonated and when the second element is in a cationic form.

7. The battery of claim 2, wherein each of the catholyte and the anolyte further comprises a chelating agent.

8. The battery of claim 7, wherein the chelating agent comprises ethylenediamine tetraacetic acid.

9. The battery of claim 2, wherein each of the catholyte and the anolyte further comprises a compound that reduces hydrogen overpotential.

10. The battery of claim 9, wherein the compound is selected from the group consisting of indium, bismuth, tin, gallium, thallium, diindium trioxide, dibismuth trioxide, tin oxide, and digallium trioxide.

11. A battery comprising a cell with a separator that separates the cell into a cathode compartment and an anode compartment, wherein the cathode compartment includes a catholyte that includes cerium, wherein the anode compartment comprises an anolyte that includes a second element, and wherein the cerium and the second element allow normal operation of the battery when the anode compartment comprises at least 5 vol % catholyte, and wherein the second element is chemically distinct from the cerium, and wherein reduction of the cerium at the cathode and oxidation of the second element at the anode provides current produced by the battery.

12. The battery of claim 11 wherein the anode compartment comprises at least 10 vol % catholyte under operating conditions.

13. The battery of claim 11 wherein the separator comprises a solid polymer electrolyte membrane.

14. The battery of claim 11 wherein the separator comprises a copolymer of perfluorosulfonic acid and polytetrafluoroethylene.

15. The battery of claim 11 wherein the battery comprises a plurality of cells, and wherein at least some of the cells include a bipolar electrode.

16. The battery of claim 15 wherein the bipolar electrode comprises glassy carbon.

17. The battery of claim 11 wherein the second element is selected from the group consisting of zinc, titanium, lead, mercury, cadmium, and tin.

18. The battery of claim 17 wherein the second element is zinc, and wherein the electrolyte comprises methane sulfonic acid.

19. The battery of claim 18 having an open circuit voltage of at least 2.4 Volt.

20. The battery of claim 11 wherein the cerium is replaced by a lanthanide other than cerium.

* * * * *